US008210162B2

(12) United States Patent
Simmers

(10) Patent No.: US 8,210,162 B2
(45) Date of Patent: Jul. 3, 2012

(54) TRACKING DEVICE WITH WEATHERVANING WIND STOWAGE MODE OF OPERATION

(76) Inventor: Douglas Evan Simmers, Massillon, OH (US)

(*) Notice: Subject to any disclaimer, the term of this patent is extended or adjusted under 35 U.S.C. 154(b) by 457 days.

(21) Appl. No.: 12/434,791

(22) Filed: May 4, 2009

(65) Prior Publication Data
US 2010/0275901 A1    Nov. 4, 2010

(51) Int. Cl.
*F24J 2/46* (2006.01)
(52) U.S. Cl. .................. 126/571; 126/572; 126/574
(58) Field of Classification Search .......... 126/571, 126/574, 601, 570, 572, 600
See application file for complete search history.

(56) References Cited

U.S. PATENT DOCUMENTS

| 4,172,739 | A | 10/1979 | Tessen |
| 4,201,973 | A | 5/1980 | Jackson |
| 4,256,088 | A | 3/1981 | Vindum |
| 4,354,484 | A | 10/1982 | Malone et al. |
| 4,362,931 | A | 12/1982 | Marko et al. |
| 4,458,670 | A | 7/1984 | Henry |
| 4,583,520 | A | 4/1986 | Dietrich et al. |
| 4,870,949 | A | 10/1989 | Butler |
| 5,103,646 | A | 4/1992 | Fini |
| 5,325,844 | A | 7/1994 | Rogers et al. |
| 5,758,938 | A | 6/1998 | Osterwisch |
| 6,123,067 | A | 9/2000 | Warick |
| 6,662,801 | B2 * | 12/2003 | Hayden et al. ............... 126/571 |
| 7,299,632 | B2 | 11/2007 | Liang et al. |
| 7,884,279 | B2 | 2/2011 | Dodd et al. |

* cited by examiner

*Primary Examiner* — Alfred Basichas

(57) ABSTRACT

An improved tracking device comprised of a lightweight structural design optimized to carry it's own mass, that mass of a lightweight incident surface or surfaces for reflecting or absorbing energy, and to withstand the forces of low to medium wind loads. A weathervaning stowage mode is initiated under high wind conditions that will inherently rotate the structure such that the reflective facets will face away from the oncoming wind and any entrained dust, hail, or other particulate. The incident surfaces will also pivot upwards via pivots near the top mounting point to reduce the surface area presented to the wind and the resultant aerodynamic forces. A fixed wind deflector is employed to transfer wind load from the top of the incident surface(s) above the point of rotation where the wind load inhibits rotation to the bottom of the facet where upward rotation is enhanced.

4 Claims, 7 Drawing Sheets

Side view of Figure 1 embodiment.

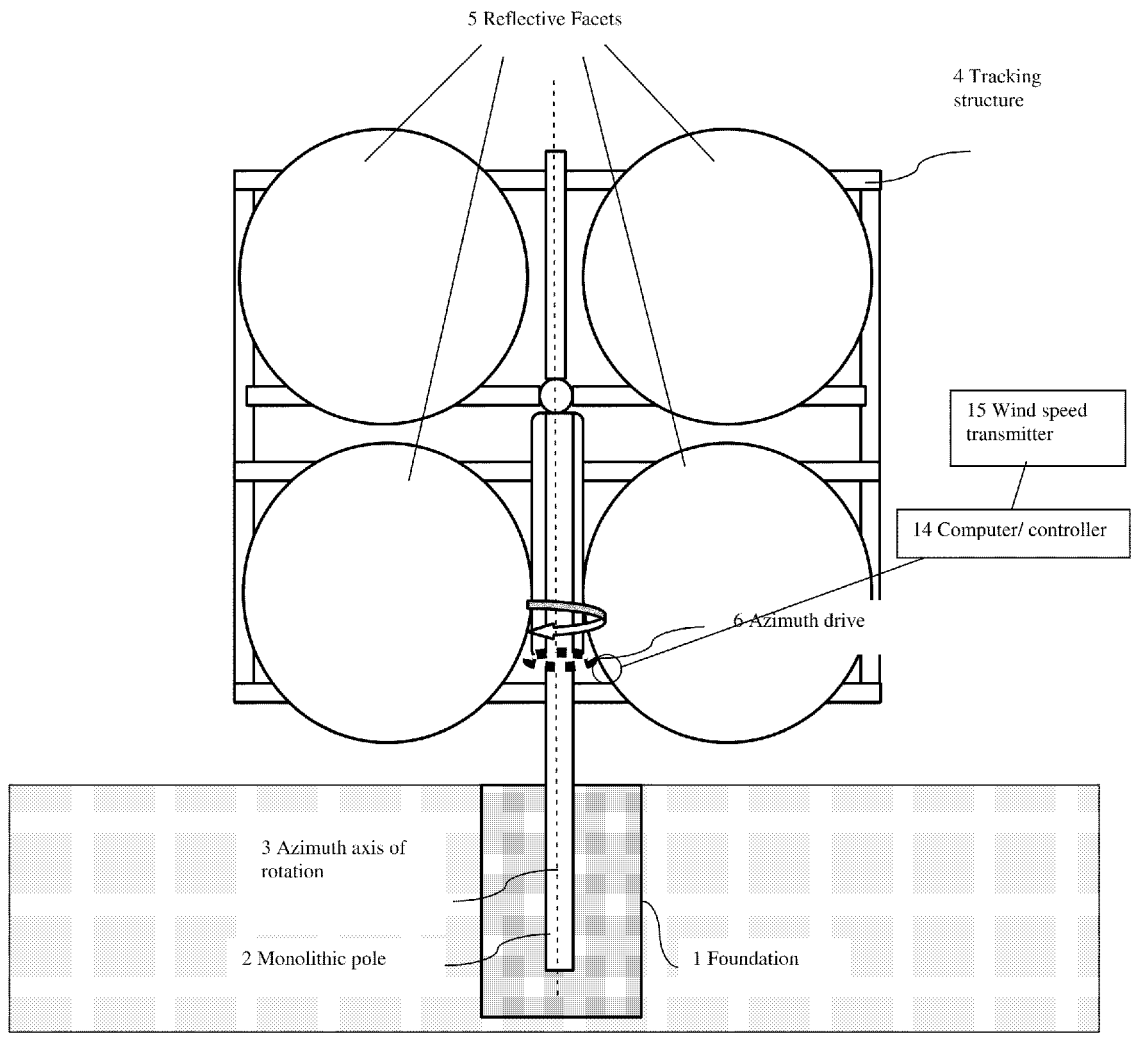
Figure 1- Preferred embodiment of an improved tracking device with a monolithic center pole forming the azimuth axis of rotation. Front View.

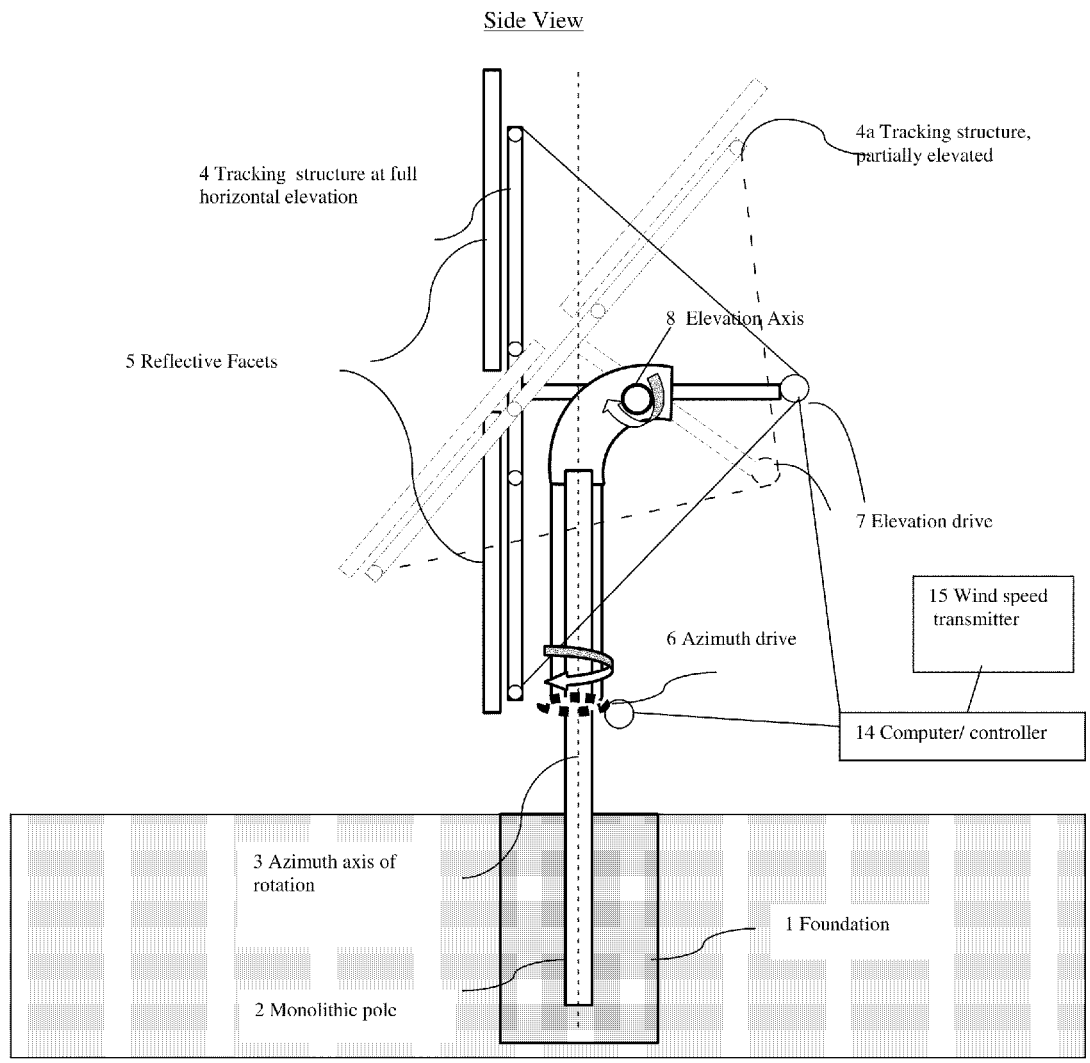
Figure 1A- Side view of Figure 1 embodiment.

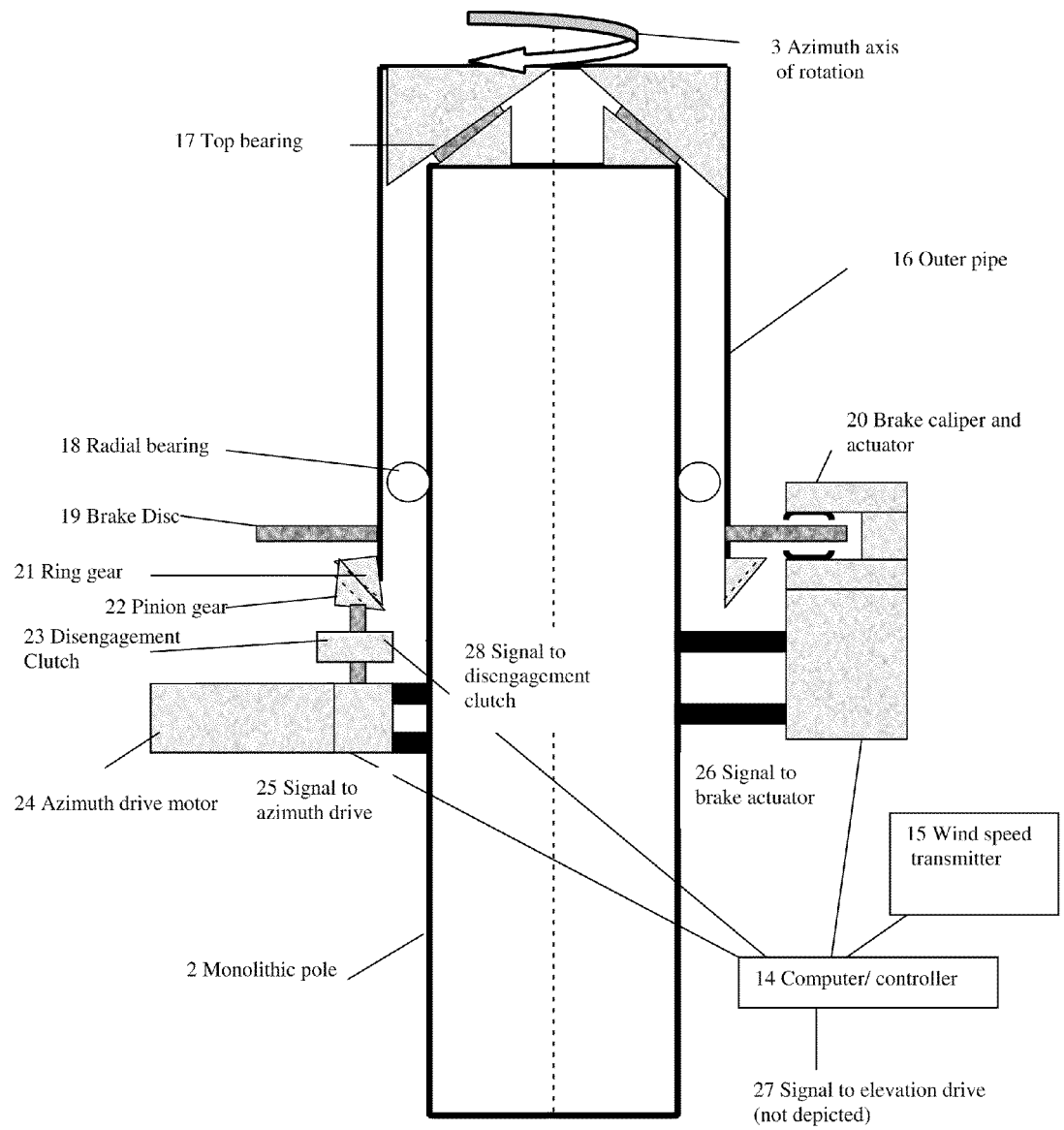
Fig. 1B- Detailed cross sectional view of azimuth axis of rotation, and drive mechanism for the Figure 1 embodiment

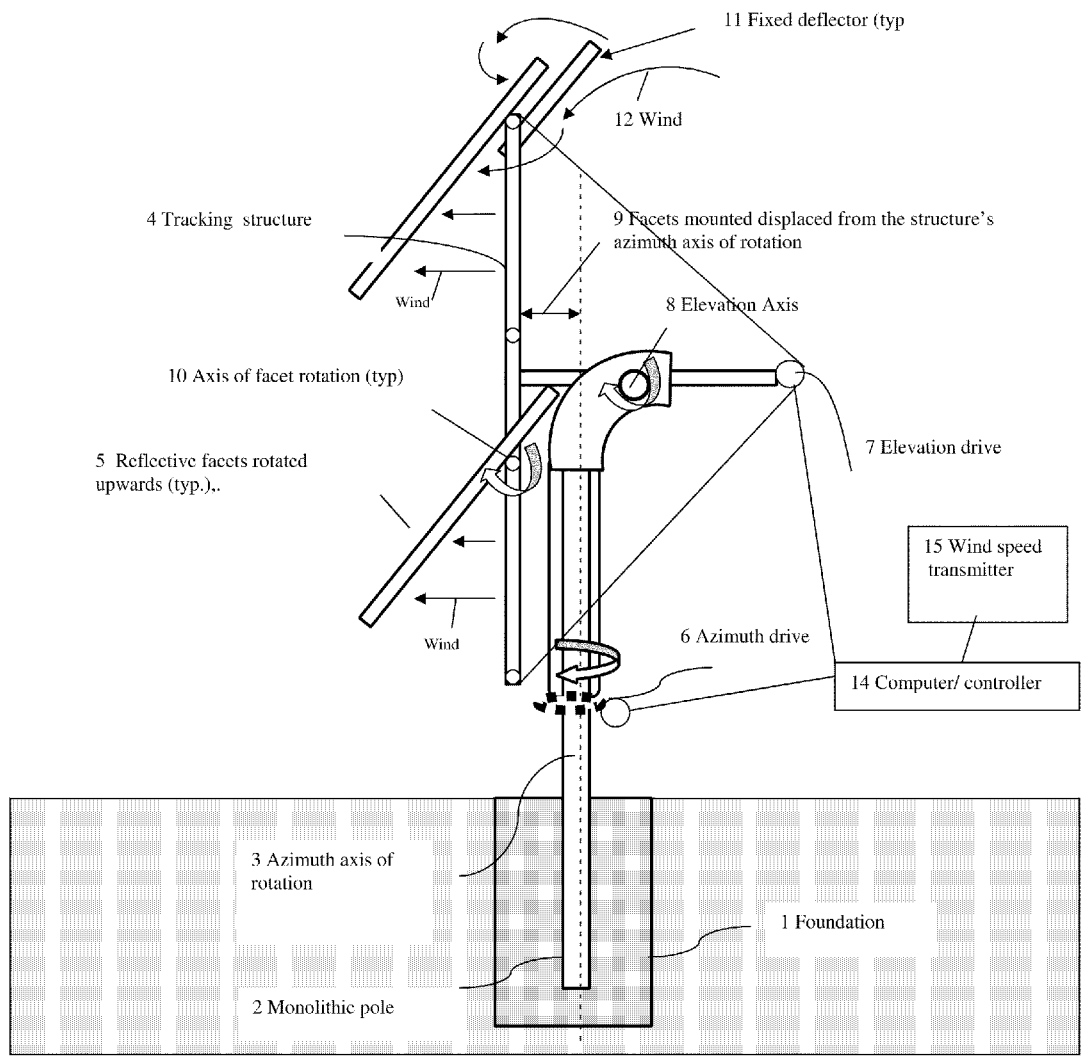
Figure 1C- Side view of figure 1 embodiment in wind stowage mode.
Aerodynamic design promotes weathervaning in high winds.

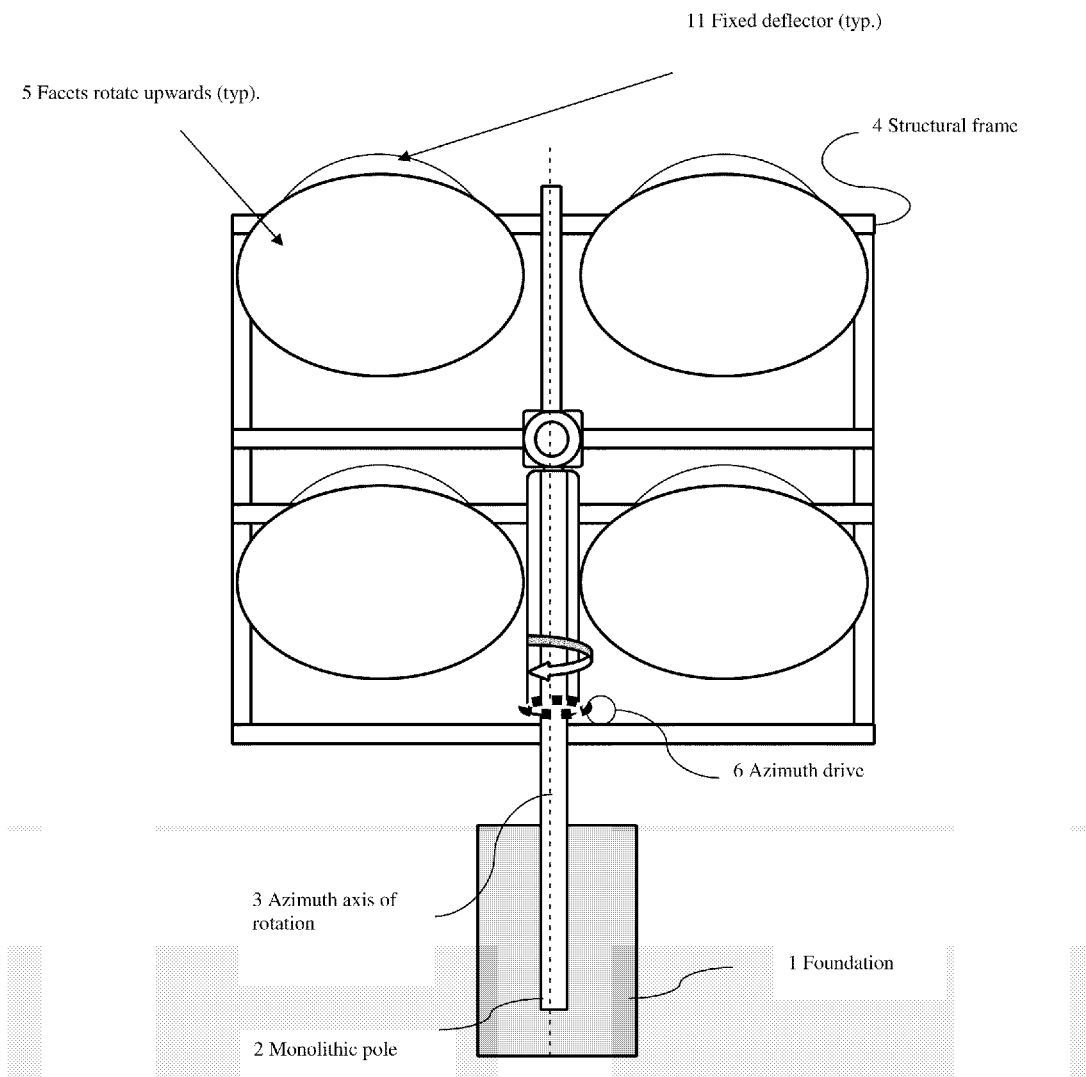
Figure 1D- Front view of figure 1 embodiment in wind stowage mode.

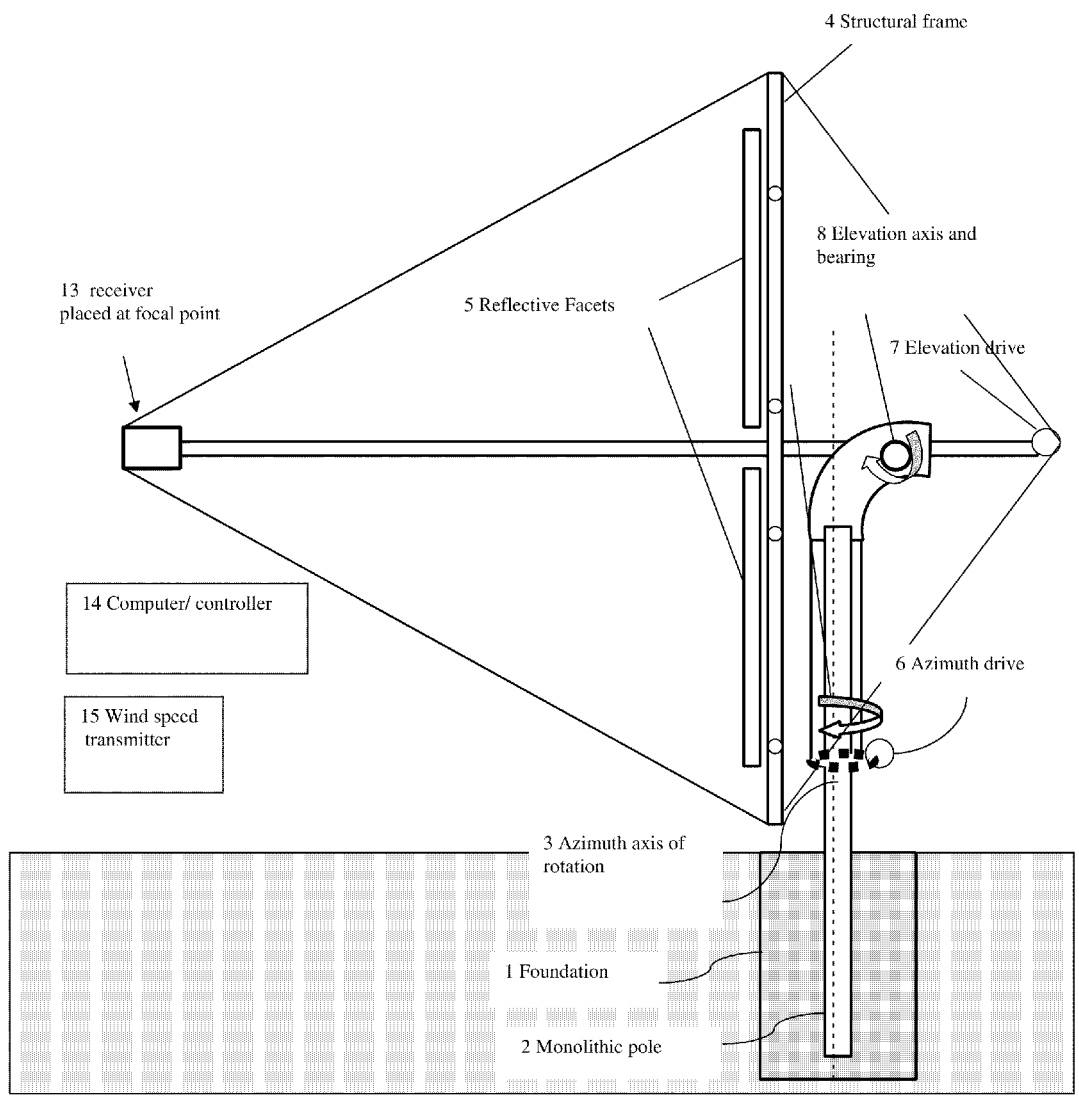
Figure 2- Another embodiment of a celestial tracking device, with integral receiver for collecting concentrated energy. Side view.

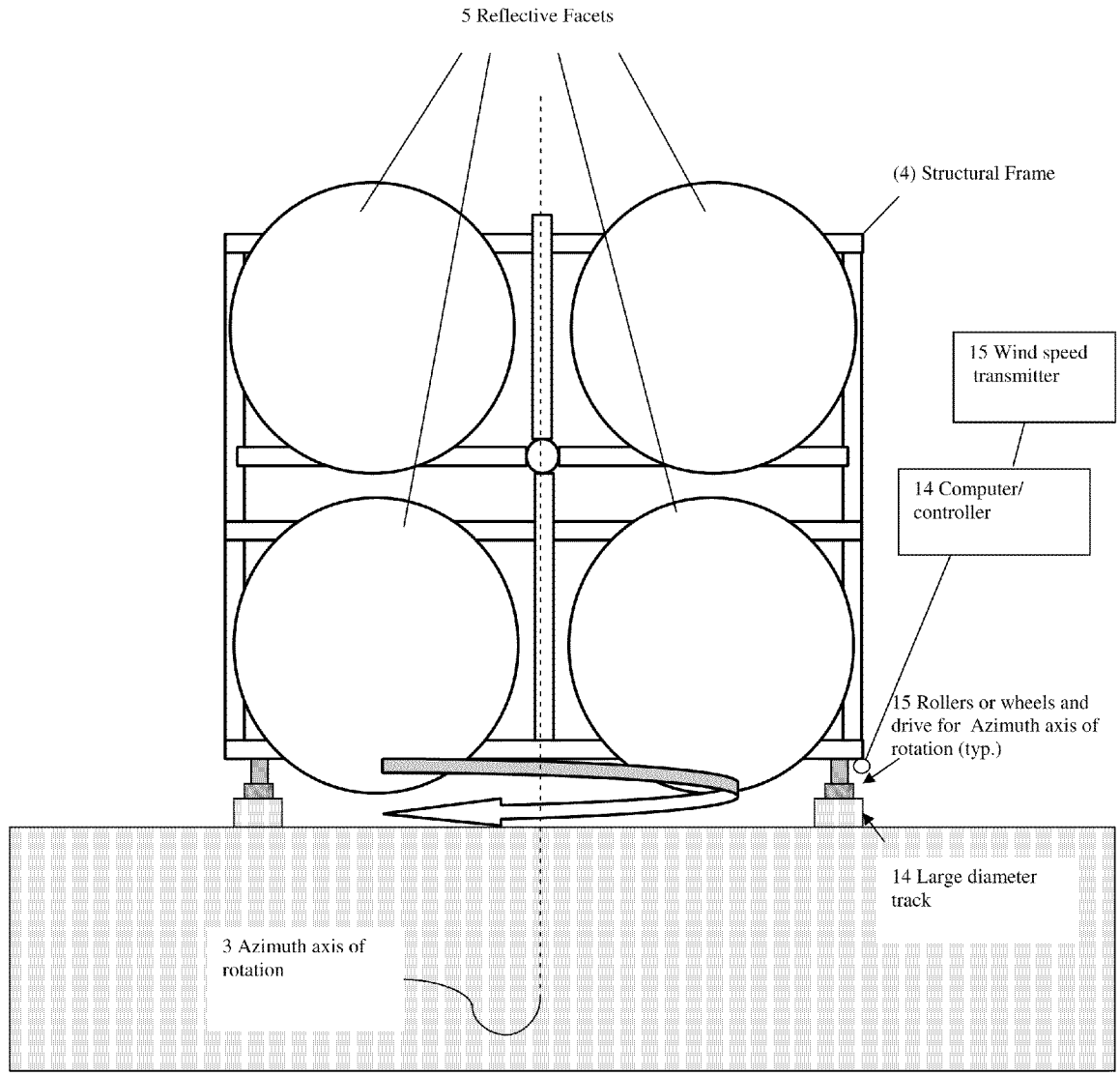
Fig. 3 Another embodiment of an improved tracking device, with a large diameter track to execute azimuth rotation. Front view.

TRACKING DEVICE WITH WEATHERVANING WIND STOWAGE MODE OF OPERATION

REFERENCES CITED

US patent Documents:

| | | | |
|---|---|---|---|
| (1) | 4,172,739 | 1979 | Tassen |
| (2) | 4,201,973 | 1980 | Jackson |
| (3) | 4,256,088 | 1981 | Vindum |
| (4) | 4,362,931 | 1982 | Maruko, et. al. |
| (5) | 4,354,484 | 1982 | Malone, et. al. |
| (6) | 44,458,670 | 1984 | Lhenry |
| (7) | 4,583,520 | 1986 | Dietrich, et al. |
| (8) | 4,870,949 | 1986 | Butler |
| (9) | 5,325,844 | 1989 | Rogers, et al. |
| (10) | 5,103,646 | 1992 | Fini |
| (11) | 5,758,938 | 1998 | Osterwisch |
| (12) | 6,123,067 | 2000 | Warrick |
| (13) | 6,662,801 | 2003 | Hayden, et al. |
| (14) | 7,299,632 | 2007 | Liang, et al. |

CROSS REFERENCE TO RELATED APPLICATIONS

The embodiment depicted in the drawings of this invention utilizes the improved stretched membrane device called out in U.S. Pat. No. 7,374,301, filed by the inventor in 2005.

FEDERALLY SPONSORED RESEARCH

Not applicable

SEQUENCE LISTING OR PROGRAM

Not applicable

BACKGROUND OF THE INVENTION

1. Technical Field of the Invention

The present invention relates to the field of tracking devices, and more specifically to weathervane stowage of tracking devices.

2. Background

Tracking structures are required for a variety of applications, from optical and radio telescopes viewing celestial objects to solar systems tracking the sun to cameras tracking moving objects to radar viewing flying objects both within and beyond earth's atmosphere. Tracking structures may also have a function of reflecting incoming radiant or acoustical energy and delivering focused energy to a point as with a focusing solar system or an acoustical focusing system. These tracking systems may have the goal of tracking the sun or other celestial body with the goal of concentrating the incident incoming energy. This requires dynamic movement of the tracking structure in both azimuth and elevation. It is usually desirable for the tracking structure to present the maximum square footage of incident surface area to the oncoming radiation (as with a solar concentrating system), light (as with a telescope), or reflected signal (as with a radar or sonar dish). The tracking mechanisms must be designed to be strong enough to position these large surfaces very accurately, to endure high wind conditions, and also to minimize the damage from any particulate material carried with the wind, such as dust, sand, and hail. New technologies offer lightweight and less costly materials for receiving incident energy, such as reflective film or thin glass for solar concentrators. The author's U.S. Pat. No. 7,374,301 discusses one such lightweight concentrating reflector. While these new lightweight materials can further reduce the weight and cost of the tracking structure during normal operation, large surface areas still present a significant aerodynamic load on the tracking structures during high wind conditions. The cost and weight of a tracking structure may be required to be much greater to endure these infrequent but potentially catastrophic wind events. Wind also can act as a vehicle to carry sand, hail, and other particulate matter which can mar the reflective or other incident surfaces, decreasing their viability over time.

OBJECTS AND ADVANTAGES

A primary goal of this invention is a lightweight design of a tracking structure that can enter a stowage mode whereby the tracking structure and the incident surfaces it carries will passively weathervane away from the oncoming wind.

Passive weathervaning structures are common for other applications, such as for measuring wind direction, for windmills that generate electricity, etc. The claims embodied within this submittal are novel in that they pertain to a protection mode for a tracking structure.

Jackson describes a wind direction and velocity device for airports that could weathervane, but without any tracking capability.

Hayden, Vindum, Malone et. al., Maruko, Jackson, and Butler all describe solar tracking devices with a wind stowage mode. None of these utilize weathervaning principles, however. Hayden et al do provide for a braking system for an azimuth drive that will slip under high wind forces, but the primary method of stowing the tracking system is actively positioning the structure into a fixed horizontal position.

Fini developed a combination solar and wind device that would rotate 360 degrees around a vertical axis. This free rotation was not a stowage mode, however, but intended as an active wind turbine mode for generating electricity.

Another goal of this system is a design whereby incident surfaces, dishes, facets, etc. passively pivot upwards on hinges or bearings in high winds to present a smaller surface area to the oncoming high winds.

Another goal is to protect the reflective surfaces from abrasive effects of sand, hail, and other particulate that may be carried with the wind.

Another goal of this system is a stationary wind deflector that transfers wind load from the upper portion of incident surfaces, dishes, facets, etc. to the lower section of the incident surfaces in order to enhance the tendency pivot upwards in high wind conditions.

BRIEF SUMMARY OF THE INVENTION

An improved tracking device comprised of a lightweight structural design with two modes of operation. In normal tracking mode, the tracking structure is optimized to carry it's own mass, that mass of a lightweight incident surface or surfaces, and to withstand the forces of low to medium wind loads. A weathervaning stowage mode is initiated under high wind conditions that will inherently rotate the structure such that the active side of incident surfaces will face away from the oncoming wind and any entrained dust, hail, or other particulate. The incident surfaces will also pivot upwards via pivots near the top mounting point to reduce the surface area presented to the wind and the resultant aerodynamic forces. A fixed wind deflector is employed to transfer wind load from the top of the incident surface(s) above the point of rotation where the wind load inhibits rotation to the bottom of the facet where upward rotation is enhanced.

BRIEF DESCRIPTION OF THE SEVERAL VIEWS OF THE DRAWINGS

FIG. 1 depicts a front view of the overall preferred embodiment of the invention, with a monolithic pole for supporting the tracking structure, and moving it in the azimuth axis.

FIG. 1A depicts a side view of the preferred embodiment, detailing elevation axis of movement.

FIG. 1B depicts a detailed cross sectional view of the azimuth rotational axis and one embodiment of it's drive mechanism.

FIG. 1C a side view while in wind stowage mode.

FIG. 1D depicts a front view while in wind stowage mode.

FIG. 2 depicts another embodiment with an integral receiver for capturing concentrated energy.

FIG. 3 depicts another embodiment with a large diameter track for supporting the structure, and for establishing the azimuth axis of rotation.

DETAILED DESCRIPTION OF THE INVENTION

FIG. 1 depicts a front view of the overall preferred embodiment of the invention, with monolithic pole 2 and it's supporting foundation 1 for supporting the entire tracking structure 4. The pole also forms the axis of rotation for the azimuth axis 3 via a drive mechanism 6. Incident surfaces in this embodiment are concentrating reflective facets 5, and are carried with the tracking structure.

FIG. 1A depicts a side view of the preferred embodiment, detailing the elevation axis of rotation 8 and it's associated drive components 7. Item 4 depicts the tracking structure in the near vertical plane of elevation axis, and the phantom lines 4a depict the tracking structure while partially elevated.

FIG. 1B depicts a detail of the azimuth axis of rotation, detailing it's 360 degrees of rotation and one embodiment of it's drive mechanism. The monolithic pipe 2 forms the primary structure and also the azimuth axis of rotation. An outer pipe 16 rotates around the monolithic pipe via a top bearing 17 and a radial bearing 18. A ring gear 21 is welded to the outer pipe 16, and engages with a pinion gear 22 on the azimuth actuator motor 24. A clutching arrangement 23 is provided to disengage the azimuth motor when in weather-vaning mode, permitting the outer pipe 16 to freewheel uninhibited. A brake disc 19, caliper and actuator 20 are provided to firmly hold rotational position when in the tracking mode. The computer/controller 14 determines the desired position of the azimuth drive actuator 24, elevation drive (not depicted) and azimuth brake actuator 20 while in operational mode, and sends actuating signals to each. The wind indicator 15 provides wind speed information to the computer/controller, which will initiate a weathervane stowage mode of operation at a predetermined wind velocity, and send signals 26,27, 28 whereby the azimuth drive disengagement clutch 23 will disengage the drive, the azimuth brake 20 will open, and the elevation drive (not depicted) will also disengage, permitting a vertical orientation via gravity. Elevation drive is of more conventional design, and not depicted.

FIG. 1C depicts a side view while in wind stowage mode, with elevation drive 7 disengaged, and gravity causing it to pass to a near-horizontal position, and the azimuth drive 6 also disengaged, permitting the tracking structure to rotate freely in the wind 11. Reflective facets 5 make up the major surface area presented to the wind 11, and the displacement 9 of these facets from the azimuth axis causes the tracking structure 4 to inherently rotate away from the wind, turning the reflective facets 5 away from any damaging entrained sand, dust, hail, or other particulate matter. Further, the reflective facets 5 are free to pivot upwards 10 reducing the area they present to the wind, allowing a significant amount of wind 12 to pass underneath a given facet, and lessening the total amount of wind force applied to the tracking structure 4. Wind 11 contacting the bottom of a given facet enhances the rotation of that facet upwards, lessening the wind forces endured by the structural frame. Wind 12 contacting the top portion of a given facet inhibits this upwards rotation, and also applies force to the facet mounting and the tracking structure 4. A wind deflector 13 is fixed to the tracking structure at a given angle to deflect wind from the top portion of the dish to the bottom portion of the dish. This transfer of wind force enhances the favorable upward rotation of a facet 5, and minimizes the force applied to the facet mount, and also to the entire tracking structure.

FIG. 1C depicts a front view while in wind stowage mode, clarifying the area reduction of the facets 5 induced by their upward rotation, and also a placement of the fixed deflector 13 behind the facets.

FIG. 2 depicts another embodiment with an integral receiver 13 for capturing concentrated energy.

FIG. 3 depicts another embodiment with a large diameter track 14 for supporting the structure, and for establishing the azimuth axis 3. Rollers or wheels and drive 15 provide the method of azimuth rotation.

OPERATION OF THE INVENTION

The tracking structure 4 will have a normal operational mode and a stowage mode. In the normal operational mode, the processor 14 will determine the desired position of the tracking structure, and send actuating signals to the azimuth and elevation drives 6,7, which will position the tracking structure 4 such that the incident surfaces 5 are positioned in an orientation most favorable for the desired function. The preferred embodiment depicted is for positioning mirrors or facets to reflect sunlight to a collector or receiver where the energy can be collected and transported for use. In this embodiment, a computer or other processor 14 calculates the position of the sun, and sends the number or magnitude of signal(s) to each axis drive, thereby positioning the frame structure and it's reflective facets to a placement whereby the reflected light is directed onto a receiving heat exchanger or boiler. The heat exchanger or boiler may be integrally mounted to the frame structure FIG. 2, or mounted to a separate tower or other structure. A wind speed transmitter 15 will send velocity information to the computer 14, and when winds exceed a given velocity, a weathervane mode will be initiated whereby the azimuth and elevations drives 6,7 shall disengage. The elevation axis will be positioned via gravity to a vertical position whereby the facets are fully upright. The azimuth axis will release, permitting the entire tracking structure to rotate freely 360 degrees. The large surfaces of the facets are placed offset of the azimuth axis FIG. 1b, 9, causing a natural weathervaning action whereby the tracking structure will always rotate away from the wind such that the reflective surfaces 5 face away from any entrained sand, hail, or other particulate matter. Additionally the facets 5 are mounted on pivots 10 such that they can rotate upwards, permitting the wind to pass underneath, and reducing the surface area exposed to the wind. Deflectors 13 are fixed to the top of the frame structure 4 in front of the top portion of each facet. The deflector 13 directs wind 12 from the top portion of the facet where the forces inhibit pivoting upwards to the lower portion of the facet where pivoting is enhanced. When the wind speed is measured to be below a given level by the wind speed transmitter 15, the computer will initiate the normal operational mode.

DESCRIPTION AND OPERATION OF ALTERNATIVE EMBODIMENTS

Thus the reader can see that the improved tracking structure is designed to take advantage of lightweight reflective or other incident materials which enable a lightweight tracking structure design while at the same time affording a stowage mode that will prevent catastrophic failure in high winds, and also minimize damage from entrained abrasive materials contained in the wind. While the above description contains many specificities, these should not be construed as limitations on the scope of the invention, but rather as an exemplification of the preferred embodiments thereof. Many other variations are possible. While the preferred embodiment depicts incident surfaces as four circular facets with reflective surfaces configured for focusing solar energy to a common point, this tracking device can be used for tracking any elevated body, celestial, or in flight. The facets can be focusing or planar, attuned to accept or reflect any spectra of electromagnetic or acoustical energy. The facets can be of any dimensional shape, and mounted singularly, or in any plurality. The foundation may be a monolithic pole as depicted in FIG. 1, or may be a large diameter track as depicted in FIG. 3. The receiving device may be integral to the tracking structure as in FIG. 2, or may be autonomous, free-standing, and mounted away from the tracking structure. Accordingly, the scope of the invention should be determined not by the embodiments illustrated, but by the appended claims and their legal equivalents.

What is claimed is:

1. An improved tracking structure with weathervaning stowage mode of operation comprising (a) a stable foundation, (b) a tracking structure with azimuth and elevation axes of rotation, (c) a means of attaching said tracking structure to said foundation, (d) a rotary transmission means for imparting rotational motion to said azimuth axis of rotation, (e) and a means of attaching said rotary transmission means to said tracking structure's azimuth axis of rotation, (f) a rotary transmission means for imparting rotational motion to said elevation axis of rotation, (g) a means of attaching said rotary transmission means to said tracking structure's elevation axis of rotation, (h) an incident surface or plurality of incident surfaces mounted to said tracking frame, (i) a means of attaching the incident surface or plurality of incident surfaces to said tracking structure, (j) a computer or other controller providing a means of controlling said axis drives in normal operation and thereby positioning said tracking structure to a desired position, wherein improvements consist of (k) a wind speed measuring instrument for measuring wind speed, (l) a means of transmitting said wind speed measurements to said computer or other controller, and also providing a means for determining said weathervaning mode at a predetermined wind speed, (m) said weathervaning mode of operation being initiated by the active placement and holding of facets into a vertical orientation via said elevation rotary transmission means, and by the release of said transmission means on the azimuth axis so that a free weathervaning rotation about the azimuth axis of rotation can be initiated and maintained in a passive condition (n) an attachment location of said incident surface or plurality of incident surfaces in an offset orientation to the azimuth axis of rotation, whereby an aerodynamic configuration is established that will inherently weathervane said tracking structure in a wind condition of predetermined speed.

2. The apparatus of claim 1 wherein said elevation axis of rotation places the facets into a vertical orientation, and said incident surfaces or plurality of incident surfaces are mounted on pivots whereby said incident surfaces may passively pivot up in a high wind without the further use of the elevation means of rotation, thereby presenting a reduced surface area to the oncoming wind, thereby minimizing the wind forces on the mounting of the incident surfaces and also reducing the total wind forces on the tracking structure.

3. An improved tracking structure with weathervaning stowage mode of operation comprising: (a) a stable foundation, (b) a tracking structure with azimuth and elevation axes of rotation, (c) a means of attaching said tracking structure to said foundation, (d) a rotary transmission means for imparting rotational motion to said azimuth axis of rotation, and also permitting 360 degrees of rotation of said azimuth axis of rotation, (e) a means of attaching said rotary transmission means to said tracking structure's azimuth axis of rotation, (f) a rotary transmission means for imparting rotational motion to said elevation axis of rotation, (g) a means of attaching said rotary transmission means to said tracking structure's elevation axis of rotation, (h) an incident surface or plurality of incident surfaces mounted to said tracking frame, (i) a means of attaching said incident surface or plurality of incident surfaces in an offset orientation to the azimuth axis of rotation, whereby an aerodynamic configuration is established that will inherently and passively weathervane said tracking structure without the use of said rotational transmission means of either axis once the elevation axis of rotation has been placed into a vertical orientation, and in a wind condition of predetermined speed, (j) a computer or other controller providing a means of controlling said axis drives in normal operation and thereby positioning said tracking structure to a desired position, (k) a wind speed measuring instrument for measuring wind speed, (l) a means of transmitting said wind speed measurements to said computer or other controller, whereby said computer or controller can provide a means for determining wind stowage mode at a predetermined wind speed, (m) a means of releasing said azimuth rotary transmission means while in wind stowage mode whereby free rotation around the azimuth axis is enabled.

4. The apparatus of claim 3 employing a fixed wind deflector mounted to the top portion of said tracking frame in an upwind orientation of said incident surface or plurality of surfaces such that while in said weathervane mode, and at a predetermined point above said pivot point of said incident surfaces to transfer wind load forces from points above said incident surfaces' pivot point to the portion of said incident surfaces below the rotational axis, whereby a positive pivoting of the facet upward is enhanced, promoting greater said area reduction, and reducing said wind forces on both incident surface mount and also on the total tracking structure.

* * * * *